United States Patent
Tanaka et al.

(10) Patent No.: US 9,998,619 B2
(45) Date of Patent: Jun. 12, 2018

(54) ELECTRONIC APPARATUS WITH A HORIZONTALLY SWINGABLE DISPLAY PANEL

(71) Applicant: KYOCERA Document Solutions Inc., Osaka (JP)

(72) Inventors: Hiroyuki Tanaka, Osaka (JP); Motoyuki Fukuda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days. days.

(21) Appl. No.: 15/428,852

(22) Filed: Feb. 9, 2017

(65) Prior Publication Data

US 2017/0257501 A1 Sep. 7, 2017

(30) Foreign Application Priority Data

Mar. 2, 2016 (JP) .................................. 2016-039693

(51) Int. Cl.
*H04N 1/00* (2006.01)
*H04N 1/06* (2006.01)
*H04N 1/29* (2006.01)
*G03G 15/00* (2006.01)

(52) U.S. Cl.
CPC ..... *H04N 1/00496* (2013.01); *G03G 15/5016* (2013.01); *H04N 1/06* (2013.01); *H04N 1/29* (2013.01); *H04N 2201/0082* (2013.01)

(58) Field of Classification Search
CPC ........ H04N 1/00496; H04N 1/06; H04N 1/29; H04N 2201/0082; G03G 15/5016
See application file for complete search history.

(56) References Cited

U.S. PATENT DOCUMENTS

2013/0077114 A1* 3/2013 Short ................. G03G 15/5016 358/1.13
2014/0352112 A1* 12/2014 Somemiya ......... G03G 21/1623 16/343

FOREIGN PATENT DOCUMENTS

JP 6-320836 A 11/1994

* cited by examiner

*Primary Examiner* — Joseph S Wong
(74) *Attorney, Agent, or Firm* — Stein IP, LLC

(57) ABSTRACT

An electronic apparatus has an apparatus main body, a display panel, and an operation mechanism. The apparatus main body has a first side surface, and second and third side surfaces arranged next to the first side surface so as to sandwich it. The second and third side surfaces are arranged opposite each other. The display panel is provided in the first side surface, and is swingable in the horizontal direction. The operation mechanism is provided in the apparatus main body, is exposed at least through the second side surface, and swings the display panel. By operating the operation mechanism from the second side surface side, the display panel swings to point toward the second side surface, and a third side surface-side part of the display penal protrudes outward beyond the first side surface.

8 Claims, 6 Drawing Sheets

ELECTRONIC APPARATUS WITH A HORIZONTALLY SWINGABLE DISPLAY PANEL

INCORPORATION BY REFERENCE

This application is based upon and claims the benefit of priority from the corresponding Japanese Patent Application No. 2016-039693 filed on Mar. 2, 2016, the entire contents of which are incorporated herein by reference.

BACKGROUND

The present disclosure relates to electronic apparatuses. More particularly, the present disclosure relates to electronic apparatuses provided with a display panel provided in a side surface of an apparatus main body.

Conventionally, electronic apparatuses provided with a display panel in a side surface of an apparatus main body are known. When a display panel is, for example, fitted to a front surface of an apparatus main body in such an electronic apparatus, a user in front of the apparatus main body visually recognizes the display panel easily.

SUMMARY

According to one aspect of the present disclosure, an electronic apparatus includes an apparatus main body, a display panel, and an operation mechanism. The apparatus main body has a first side surface, and a second side surface and a third side surface arranged next to the first side surface so as to sandwich the first side surface. The second and third side surfaces are arranged opposite each other. The display panel is provided in the first side surface, and is swingable in the horizontal direction. The operation mechanism is provided in the apparatus main body, is exposed at least through the second side surface, and swings the display panel. By operating the operation mechanism from the second side surface side, the display panel swings so as to point toward the second side surface, and a third side surface-side part of the display penal protrudes outward beyond the first side surface.

Further features and advantages of the present disclosure will become apparent from the description of embodiments given below.

DETAILED DESCRIPTION

Hereinafter, embodiments of the present disclosure will be described with reference to the accompanying drawings.

First Embodiment

Figure 1:
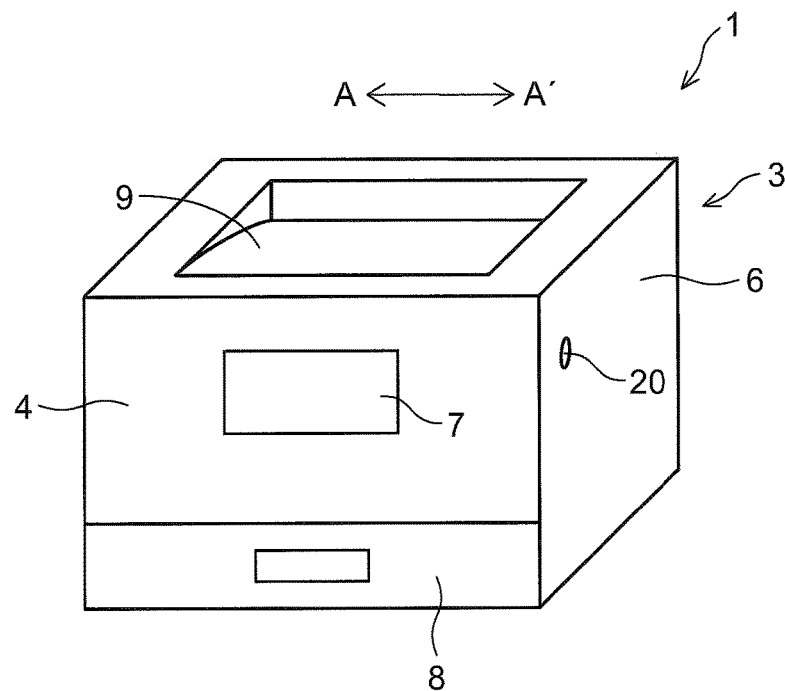
FIG. 1 is a perspective view showing a structure of an image forming apparatus according to a first embodiment of the present disclosure.

With reference to FIGS. 1 to 4, a description will be given of an image forming apparatus (electronic apparatus) 1 according to a first embodiment of the present disclosure. As shown in FIG. 1, the image forming apparatus 1 has an apparatus main body 3 having a substantially hexahedral structure. The apparatus main body 3 has four side surfaces, namely a first side surface 4 which is a front surface of the apparatus, a second side surface 5 (see FIG. 2) and a third side surface 6 which are arranged next to the first side surface 4 so as to sandwich the first side surface 4 and to be opposite each other, and a rear surface of the apparatus. The first side surface 4 is provided with a display panel 7 comprising a liquid crystal panel which displays information related to image formation, an image of buttons for touch panel operation, and the like. In a lower part of the first side surface 4, a sheet feed cassette 8 is arranged so as to be mountable/dismountable in the front/rear direction relative to the apparatus main body 3. In an upper part of the apparatus main body 3, a discharge tray 9 is arranged onto which a sheet is discharged from the apparatus rear surface side toward the apparatus front surface side.

Inside the apparatus main body 3, there are arranged an image forming portion, a fixing portion, a sheet transport passage, etc. of which none is illustrated. The image forming portion forms an image by transferring a toner image to a sheet, which is fed to it, based on image data received from a terminal of a personal computer or the like. The image forming portion includes a photosensitive drum (image carrying member) which carries an electrostatic latent image, a charging unit which electrostatically charges the surface of the photosensitive drum, an exposure unit which forms an electrostatic latent image, which corresponds to a document image, on the surface of the photosensitive drum with a laser beam or the like, a developing device which forms a toner image by attaching developer to the formed electrostatic latent image, a transfer roller which transfers the toner image to a sheet, a cleaning blade which removes toner left unused on the surface of the photosensitive drum, etc. The fixing portion applies heat and pressure to the sheet having the toner image transferred to it, thereby fixing the toner image to the sheet.

Next, a description will be given of a structure around the display panel 7.

Figure 2:
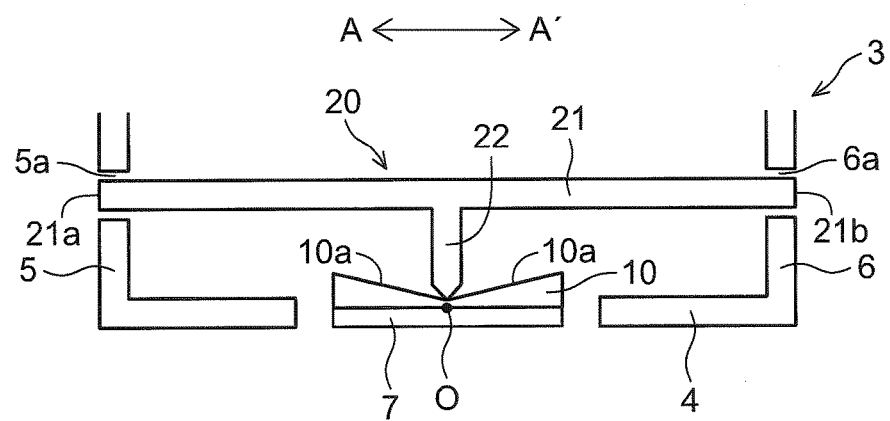
FIG. 2 is a sectional plan view showing a structure around an operation mechanism of the image forming apparatus according to the first embodiment of the present disclosure, showing a state where a display panel is arranged parallel to a first side surface.

As shown in FIG. 2, on the reverse surface (the top surface in FIG. 2) of the display panel 7, a holding member 10 is provided which swingably holds the display panel 7 in the horizontal direction. The holding member 10 holds the display panel 7 such that it is swingable about a pivot O extending in the up/down direction (the direction perpendicular to the plane of FIG. 2). In this embodiment, on the reverse surface of the holding member 10, an inclined surface 10a is formed which inclines so as to be increasingly away from the display panel 7 outward from the center of the holding member 10 in the left/right direction in FIG. 2 (the left/right direction as seen from in front of the apparatus main body 3, the direction indicated by arrows A and A').

Inside the apparatus main body 3, an operation mechanism 20 is provided which swings the display panel 7 by making contact with the holding member 10. The operation mechanism 20 is configured to be movable in the direction indicated by arrows A and A'. The operation mechanism 20 is composed of an operation portion 21 extending in the direction indicated by arrows A and A' of the apparatus main body 3, and a protruding portion 22 which protrudes from a central part of the operation portion 21 in its longitudinal direction toward the holding member 10 and which makes contact with the reverse surface of the holding member 10.

A second side surface 5-side (the direction indicated by arrow A side) end surface 21a of the operation portion 21 is exposed to the outside via a through hole 5a in the second side surface 5, and a third side surface 6-side (the direction indicated by arrow A' side) end surface 21b of the operation portion 21 is exposed to the outside via a through hole 6a in the third side surface 6.

In a state where the display panel 7 is arranged parallel to the first side surface 4 (the state in FIG. 2), the end surface 21a of the operation mechanism 20 is arranged to be flush with the second side surface 5, and the end surface 21b of the operation mechanism 20 is arranged to be flush with the third side surface 6. In the state where the display panel 7 is arranged parallel to the first side surface 4, the end surface 21a may also be arranged inward (rightward in FIG. 2) of the second side surface 5, and the end surface 21b may also be arranged inward (leftward in FIG. 2) of the third side surface 6.

When the display panel 7 is arranged parallel to the first side surface 4, the display panel 7 is arranged to be flush with the first side surface 4. When the display panel 7 is arranged parallel to the first side surface 4, the display panel 7 may also be arranged inward (upward in FIG. 2) of the first side surface 4.

Figure 3:
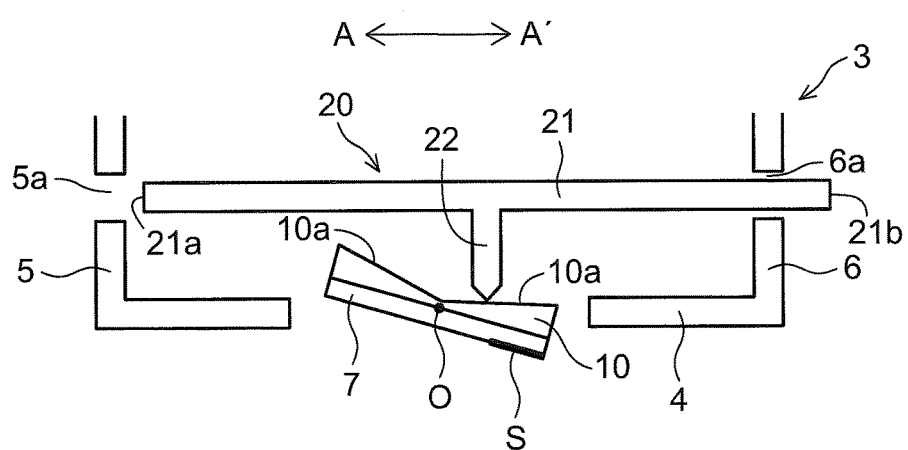
FIG. 3 is a sectional plan view showing a structure around the operation mechanism of the image forming apparatus according to the first embodiment of the present disclosure, showing a state where the operation mechanism is pressed (operated) from the second side surface side.

As the operation mechanism 20 moves in the direction indicated by arrow A' as a result of a user pressing (operating) the operation mechanism 20 from the second side surface 5 side, as shown in FIG. 3, the protruding portion 22 makes contact with the inclined surface 10a of the holding member 10, and the holding member 10 and the display panel 7 swing about the pivot O in the clockwise direction in FIG. 3. Here, the display panel 7 swings so as to point toward the second side surface 5, and a third side surface 6-side part of the display panel 7 protrudes outward beyond the first side surface 4.

Figure 4:
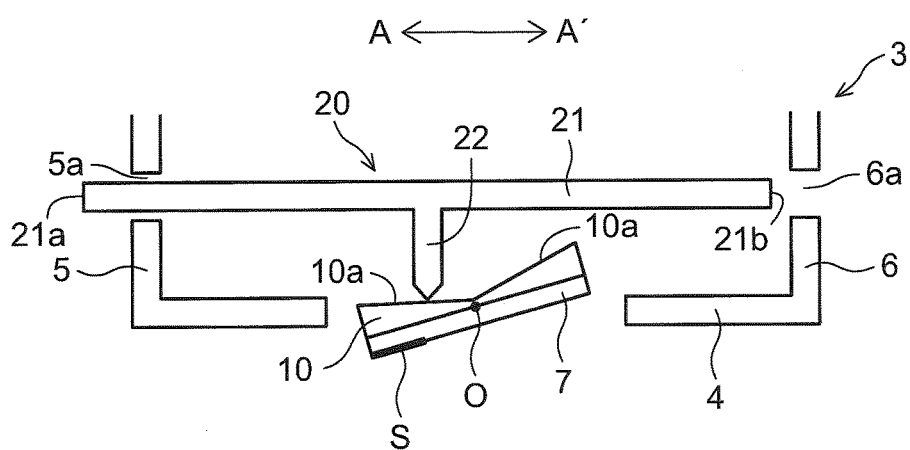
FIG. 4 is a sectional plan view showing a structure around the operation mechanism of the image forming apparatus according to the first embodiment of the present disclosure, showing a state where the operation mechanism is pressed (operated) from the third side surface side.

On the other hand, as the operation mechanism 20 moves in the direction indicated by arrow A as a result of a user pressing (operating) the operation mechanism 20 from the third side surface 6 side, as shown in FIG. 4, the protruding portion 22 makes contact with the inclined surface 10a of the holding member 10, and the holding member 10 and the display panel 7 swing about the pivot O in the counter-clockwise direction in FIG. 4. Here, the display panel 7 swings so as to point toward the third side surface 6, and a second side surface 5-side part of the display panel 7 protrudes outward beyond the first side surface 4.

When the display panel 7 swings so as to point toward the second side surface 5 or the third side surface 6 as shown in FIGS. 3 and 4, of the display panel 7, a central part has the smallest movement (movement distance) in the direction indicated by arrows A and A'. Thus, electrical wiring (unillustrated) of the display panel 7 is preferably connected to the central part of the display panel 7 in the direction indicated by arrows A and A'.

When the display panel 7 is in the state in FIG. 3 as a result of a user pressing (operating) the operation mechanism 20 from the second side surface 5 side (the left side in FIG. 2), notification display S such as error display or warning display for the user is presented in a third side surface 6-side (the right side in FIG. 3) part of the display panel 7. On the other hand, when the display panel 7 is in the state in FIG. 4 as a result of a user pressing (operating) the operation mechanism 20 from the third side surface 6 side, notification display S such as error display or warning display for the user is presented in a second side surface 5-side (the left side in FIG. 4) part of the display panel 7. That is, according to the operation direction of the operation mechanism 20, the display position of notification display S is reversed left to right.

As the user releases the pressure (operation) of the operation mechanism 20, the operation mechanism 20 returns to the original position (the position in FIG. 2) by an unillustrated biasing member, and the display panel 7 is located parallel to the first side surface 4.

In this embodiment, as described above, as a result of a user operating the operation mechanism 20 from the second side surface 5 side, the display panel 7 swings so as to point toward the second side surface 5, and the third side surface 6-side part of the display panel 7 protrudes outward beyond the first side surface 4. Thus, a user on the second side surface 5 side of the apparatus main body 3 can see the display panel 7 without going around to the first side surface 4 side; this helps improve the visibility of the display panel 7.

As described above, the operation mechanism 20 is exposed also through the third side surface 6, and as a result of a user operating the operation mechanism 20 from the third side surface 6 side, the display panel 7 swings so as to point toward the third side surface 6, and the second side surface 5-side part of the display panel 7 protrudes outward beyond the first side surface 4. Thus, irrespective of whether a user is on the left or right of the apparatus main body 3, the user can see the display panel 7 without going around to the first side surface 4 side; this helps improve the visibility of the display panel 7.

As described above, in the state where the display panel 7 is arranged parallel to the first side surface 4, the second side surface 5-side end surface 21*a* of the operation mechanism 20 is arranged to be flush with the second side surface 5 (or is arranged inward of the second side surface 5), and the third side surface 6-side end surface 21*b* of the operation mechanism 20 is arranged to be flush with the third side surface 6 (or is arranged inward of the third side surface 6). Thus, it is possible to prevent a user, an object, etc. from accidentally making contact with the operation mechanism 20.

As described above, when the display panel 7 is arranged parallel to the first side surface 4, the display panel 7 is arranged to be flush with the first side surface 4 (or is arranged inward of the first side surface 4). Thus, it is possible to prevent a user, an object, etc. from accidentally making contact with the display panel 7.

As described above, for example, when the third side surface 6-side part of the display panel 7 protrudes outward beyond the first side surface 4, notification display S for a user is presented in the third side surface 6-side part of the display panel 7. When the third side surface 6-side part of the display panel 7 protrudes outward beyond the first side surface 4, it is easy to see the third side surface 6-side part of the display panel 7 from the second side surface 5 side of the apparatus main body 3; thus it is notably effective to preferentially present notification display S which is an important matter in the part which is easy to see.

Figure 5:
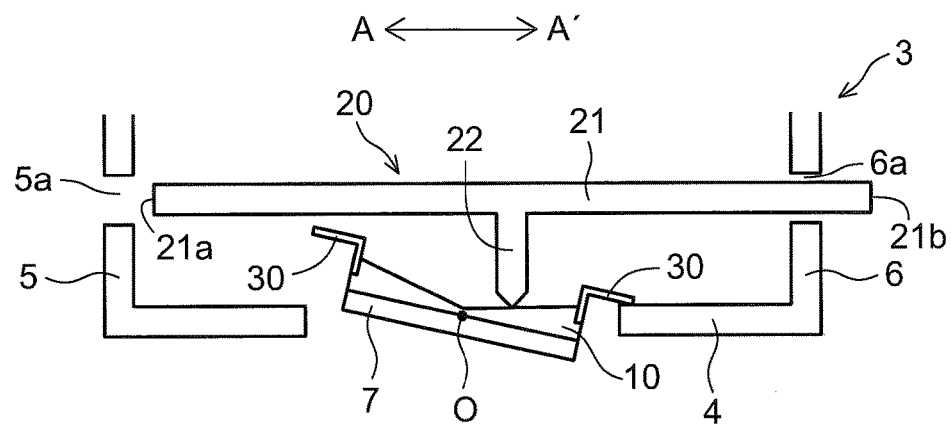
FIG. 5 is a sectional plan view showing a structure around an operation mechanism of an image forming apparatus according to a first modified example of the first embodiment of the present disclosure, showing a state where a regulating portion regulates swinging of the display panel.

As in the first modified example of the first embodiment shown in FIG. 5, regulating portions 30 which regulate swinging of the display panel 7 may be provided. Here, the regulating portions 30 are each formed of a plate-shaped member bent into an L shape, and are arranged at opposite ends of the holding member 10 in the direction indicated by arrows A and A'. By the regulating portion 30 making contact with an inner surface of the first side surface 4, swinging of the display panel 7 is regulated.

Thus, by providing the regulating portions 30 which regulate swinging of the display panel 7, it is possible to prevent the display panel 7 from over swinging.

Figure 6:
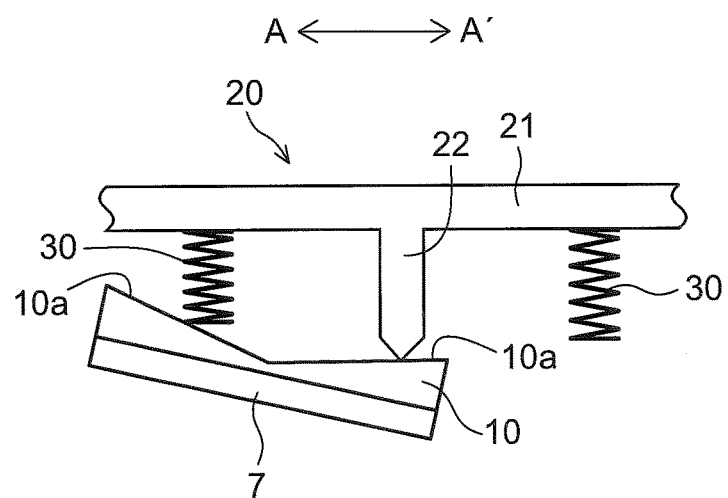
FIG. 6 is a sectional plan view showing a structure around an operation mechanism of an image forming apparatus according to a second modified example of the first embodiment of the present disclosure, showing a state where a regulating portion regulates swinging of the display panel.

As in the second modified example of the first embodiment shown in FIG. 6, regulating portions 30 which regulate swinging of the display panel 7 may be configured. Here, the regulating portions 30 are each formed of an elastic member such as a coil spring which biases the display panel 7 in the direction opposite to the swing direction, and are arranged on the operation mechanism 20. By the regulating portion 30 making contact with the reverse surface of the holding member 10, swinging of the display panel 7 is regulated.

As described above, with the regulating portions 30 formed of an elastic member, it is possible to regulate swinging of the display panel 7 gradually, and thus to prevent a large load from abruptly applying to the holding member 10, the operation mechanism 20, and the like.

Figure 7:
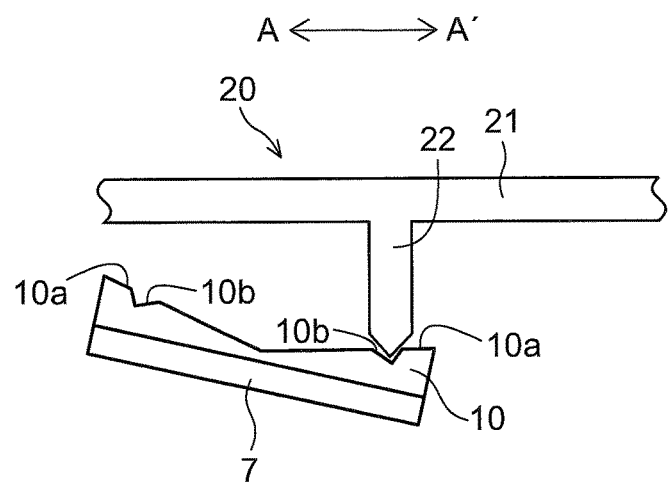
FIG. 7 is a sectional plan view showing a structure around an operation mechanism of an image forming apparatus according to a third modified example of the first embodiment of the present disclosure, showing a state where a holding member and the operation mechanism are held in an engaged state.

As in the third modified example of the first embodiment shown in FIG. 7, concavities (holding portions) 10*b* in which a tip end of the protruding portion 22 of the operation mechanism 20 fits may be provided in the reverse surface of the holding member 10. With the protruding portion 22 fitted in the concavity 10*b*, the holding member 10 and the operation mechanism 20 are held in an engaged state.

As described above, owing to the holding member 10 having the concavities 10*b* which hold the holding member 10 and the operation mechanism 20 in the engaged state, it is possible to hold the display panel 7 in a swung and protruded state even when the user releases the operation of the operation mechanism 20. That is, it is possible to prevent the display panel 7 from returning to the original state (position).

Second Embodiment

Figure 8:
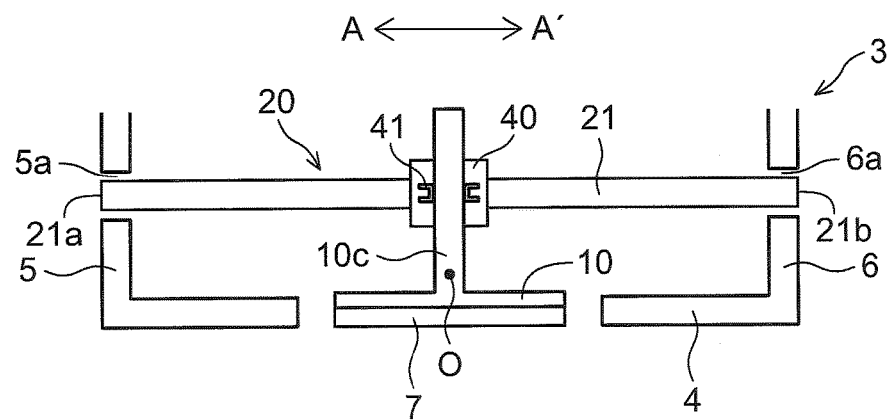
FIG. 8 is a sectional plan view showing a structure around an operation mechanism of an image forming apparatus according to a second embodiment of the present disclosure, showing a state where a display panel is arranged parallel to a first side surface.

In a second embodiment according to the present disclosure, as shown in FIG. 8, a holding member 10 which holds the display panel 7 such that it is swingable about a pivot O in the horizontal direction has a lever 10*c* protruding on the opposite side (on the apparatus rear surface side) of the holding member 10 from the display panel 7.

An operation mechanism 20 comprises an operation portion 21 extending in the direction indicated by arrows A and A' of the apparatus main body 3. To a central part of the operation portion 21 in its longitudinal direction, a link mechanism 40 is fitted which couples the operation mechanism 20 with the holding member 10. The link mechanism 40 has a pair of holding portions 41 which swingably holds the lever 10*c* between them, and moves together with the operation mechanism 20 in the direction indicated by arrows A and A'. Although in this embodiment, the holding portions 41 are configured to swing by following the lever 10*c* as it swings, the holding portions 41 do not have to be configured to swing.

Figure 9:
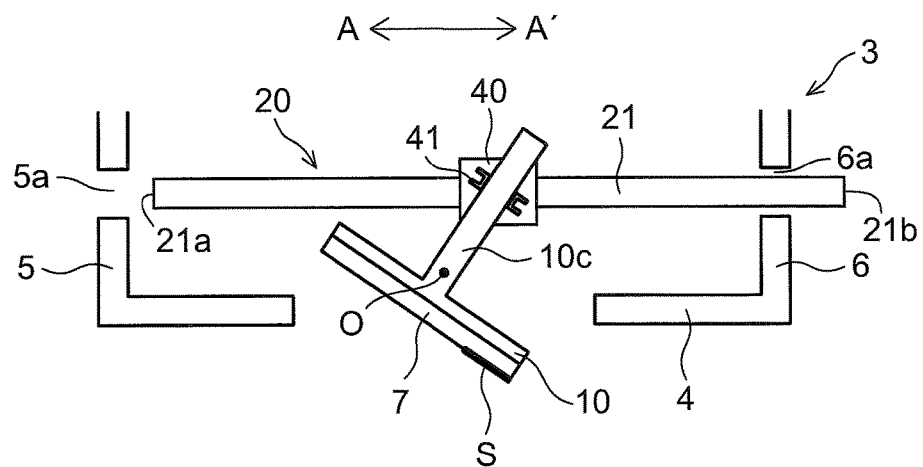
FIG. 9 is a sectional plan view showing a structure around the operation mechanism of the image forming apparatus according to the second embodiment of the present disclosure, showing a state where the operation mechanism is pressed (operated) from the second side surface side.

As the operation mechanism 20 moves in the direction indicated by arrow A' as a result of a user pressing (operating) the operation mechanism 20 from the second side surface 5 side, as shown in FIG. 9, by the action of the link mechanism 40, the holding member 10 and the display panel 7 swing in the clockwise direction in FIG. 9, and a third side surface 6-side part of the display panel 7 protrudes outward beyond the first side surface 4.

Figure 10:
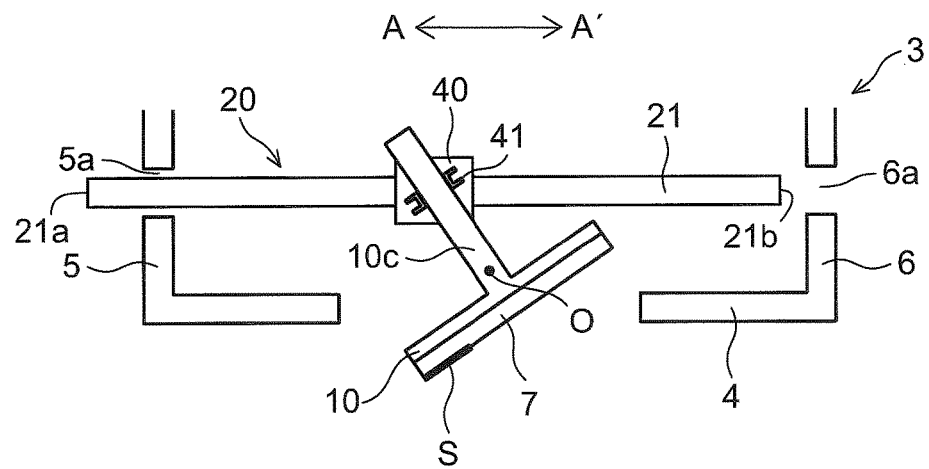
FIG. 10 is a sectional plan view showing a structure around the operation mechanism of the image forming apparatus according to the second embodiment of the present disclosure, showing a state where the operation mechanism is pressed (operated) from the third side surface side.

On the other hand, as the operation mechanism 20 moves in the direction indicated by arrow A as a result of a user pressing (operating) the operation mechanism 20 from the third side surface 6 side, as shown in FIG. 10, by the action of the link mechanism 40, the holding member 10 and the display panel 7 swing in the counter-clockwise direction in FIG. 10, and a second side surface 5-side part of the display panel 7 protrudes outward beyond the first side surface 4.

Otherwise, the structure in the second embodiment is similar to that in the previously-described first embodiment.

Also in this embodiment, as in the previously-described first embodiment, irrespective of whether a user is on the left or right of the apparatus main body 3, by operating the operation mechanism 20, the user can see the display panel 7 without going around to the first side surface 4 side; this helps improve the visibility of the display panel 7.

Otherwise, the effects of the second embodiment are similar to those of the previously-described first embodiment.

Third Embodiment

Figure 11:
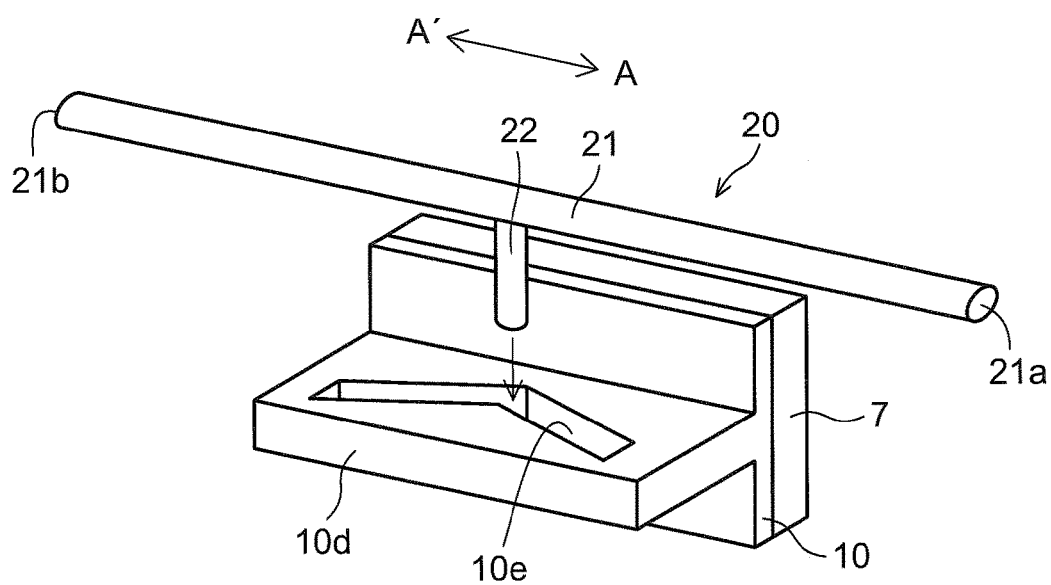
FIG. 11 is a perspective view showing a structure around an operation mechanism of an image forming apparatus according to a third embodiment of the present disclosure as seen from behind the apparatus, showing a state where a protruding portion of the operation mechanism is pulled out from an engaging concavity.

In a third embodiment according to the present disclosure, as shown in FIG. 11, a holding member 10 which swingably holds the display panel 7 in the horizontal direction has a plate-shaped portion 10*d* protruding on the opposite side (the apparatus rear surface side) of the holding member 10 from the display panel 7. In this plate-shaped portion 10d, an engaging concavity 10e is formed so as to be increasingly away from the display panel 7 outward from the center of the plate-shaped portion 10d in the direction indicated by arrows A and A'.

An operation mechanism 20 is composed of an operation portion 21 and a protruding portion 22. In this embodiment, the protruding portion 22 protrudes downward from a central part of the operation portion 21 in its longitudinal direction, and is inserted into the engaging concavity 10e of the holding member 10 to be engaged with it.

As the operation mechanism 20 moves in the direction indicated by arrow A' as a result of a user pressing (operating) the operation mechanism 20 from the second side surface 5 side (the direction indicated by arrow A side), the protruding portion 22 presses a display panel 7-side inner surface of the engaging concavity 10e, the holding member 10 and the display panel 7 swing, and a third side surface 6-side (the direction indicated by arrow A' side) part of the display panel 7 protrudes outward beyond the first side surface 4.

On the other hand, as the operation mechanism 20 moves in the direction indicated by arrow A as a result of a user pressing (operating) the operation mechanism 20 from the third side surface 6 side (the direction indicated by arrow A' side), the protruding portion 22 presses the display panel 7-side inner surface of the engaging concavity 10e, the holding member 10 and the display panel 7 swing, and a second side surface 5-side (the direction indicated by arrow A-side) part of the display panel 7 protrudes outward beyond the first side surface 4.

Otherwise, the structure in the third embodiment is similar to those in the previously-described first and second embodiments.

Also in this embodiment, as in the previously-described first and second embodiments, irrespective of whether a user is on the left or right of the apparatus main body 3, by operating the operation mechanism 20, the user can see the display panel 7 without going around to the first side surface 4 side; this helps improve the visibility of the display panel 7.

Otherwise, the effects of the third embodiment are similar to those of the previously-described first and second embodiments.

It should be understood that the embodiments disclosed herein are in every aspect illustrative and not restrictive. The scope of the present disclosure is defined not by the description of embodiments given above but by the appended claims, and encompasses many modifications and variations made in the sense and scope equivalent to those of the claims.

For example, although the above-described embodiments have dealt with an example where the present disclosure is applied to an image forming apparatus, this is in no way meant to limit the present disclosure. Needless to say, the present disclosure is applicable to various electronic apparatuses provided with a display panel provided in a side surface of an apparatus main body.

Although the above-described embodiments have dealt with an example where the display panel 7 swings so as to point toward the second side surface 5 (or the third side surface 6) as a result of a user pressing the operation mechanism 20 from the second side surface 5 (or the third side surface 6) side, this is in no way meant to limit the present disclosure. It is also possible to swing the display panel 7 so as to point toward the second side surface 5 (or the third side surface 6) as a result of a user pulling the operation mechanism 20 from the second side surface 5 (or the third side surface 6) side.

The technical scope of the present disclosure encompasses any structure obtained by combining together different features from the above-described embodiments and modified examples as necessary. For example, the regulating portions 30 in FIG. 6 and the concavities 10b in FIG. 7 may both be provided.

What is claimed is:
1. An electronic apparatus comprising:
an apparatus main body having a first side surface, and a second side surface and a third side surface arranged next to the first side surface so as to sandwich the first side surface, the second and third side surfaces being arranged opposite each other;
a display panel provided in the first side surface, the display panel being swingable in a horizontal direction; and
an operation mechanism provided in the apparatus main body, the operation mechanism being exposed at least through the second side surface and swinging the display panel, wherein
the first side surface, the second side surface, and the third side surface constitute an exterior surface of the apparatus main body,
by operating the operation mechanism from a second side surface side, the display panel swings so as to point toward the second side surface, and a third side surface-side part of the display panel protrudes outward beyond the first side surface, and
when the third side surface-side part of the display panel protrudes outward beyond the first side surface by operating the operation mechanism from the second side surface side, notification display for a user is presented in the third side surface-side part of the display panel.

2. The electronic apparatus of claim 1, wherein
the operation mechanism is exposed also through the third side surface, and
by operating the operation mechanism from a third side surface side, the display panel swings so as to point toward the third side surface, and a second side surface-side part of the display panel protrudes outward beyond the first side surface.

3. The electronic apparatus of claim 1, further comprising a regulating portion which regulates swinging of the display panel.

4. The electronic apparatus of claim 3, wherein
the regulating portion is formed of an elastic member which biases the display panel in a direction opposite to a swing direction.

5. The electronic apparatus of claim 1, further comprising a holding member which holds a reverse surface of the display panel and which engages with the operation mechanism, wherein
the holding member has a holding portion which holds the holding member and the operation mechanism in an engaged state.

6. The electronic apparatus of claim 1, wherein
when the display panel is arranged parallel to the first side surface, a second side surface-side end surface of the operation mechanism is arranged to be flush with the second side surface or is arranged inward of the second side surface.

7. The electronic apparatus of claim 1, wherein
when the display panel is arranged parallel to the first side surface, the display panel is arranged to be flush with the first side surface or is arranged inward of the first side surface.

8. The electronic apparatus of claim 1, wherein the first side surface is a front surface of the apparatus main body.

* * * * *